US005886644A

United States Patent [19]

Keskin et al.

[11] Patent Number: 5,886,644

[45] Date of Patent: Mar. 23, 1999

[54] PROGRAMMABLE DIGITAL ELECTRONIC LOCK

[75] Inventors: Yucel K. Keskin, Santa Clara; Asil T. Gokcebay, San Francisco, both of Calif.

[73] Assignee: Security People, Inc., San Francisco, Calif.

[21] Appl. No.: 835,592

[22] Filed: Apr. 10, 1997

Related U.S. Application Data

[63] Continuation-in-part of Ser. No. 615,397, Mar. 12, 1996.

[51] Int. Cl.$^{6}$ .............................. G06F 7/04; E05B 37/06; E05B 43/00; G07B 15/00

[52] U.S. Cl. .......................... 340/825.31; 70/21; 70/276; 70/271; 235/38.2

[58] Field of Search ........................... 340/825.31; 70/21, 70/276, 3, 286, 277, 278, 271; 235/38.2

[56] References Cited

U.S. PATENT DOCUMENTS

| | | | |
|---|---|---|---|
| 3,754,164 | 8/1973 | Zorzy . | |
| 3,754,213 | 8/1973 | Morroni . | |
| 3,831,065 | 8/1974 | Martin . | |
| 3,878,511 | 4/1975 | Wagner . | |
| 4,495,540 | 1/1985 | Remington . | |
| 4,665,397 | 5/1987 | Pinnow | 340/825.56 |
| 4,887,445 | 12/1989 | Beatty . | |
| 4,967,305 | 10/1990 | Murrer et al. | 361/172 |
| 5,020,345 | 6/1991 | Gartner . | |
| 5,021,776 | 6/1991 | Anderson . | |
| 5,033,282 | 7/1991 | Gartner . | |
| 5,153,561 | 10/1992 | Johnson . | |
| 5,223,829 | 6/1993 | Watabe | 340/825.31 |
| 5,321,963 | 6/1994 | Goldman | 70/278 |

*Primary Examiner*—Michael Horabik
*Assistant Examiner*—Anthony A. Asongwed
*Attorney, Agent, or Firm*—Thomas M. Freiburger

[57] ABSTRACT

An electronic lock for use with lockers has a recess or contacts for accepting an electronic ID chip as a "key". Upon receiving the current ID chip, the lock shifts a latch to unlocked position, with the latch or mortise being spring-biased. The construction of the electronic lock is modular, easily fitting on nearly all contemporary locker designs, retained by only a few screws preferably in the standard three-hole locker door prep layout. An outer housing on the outside of the locker door has an electrical plug-in connection through the door with an inner housing at the inside of the door, and the housing portions can be changed to opposite hand use. Power input ports preferably are included on the front of the outer housing to power the lock in the event of battery failure, and in addition, an audible beep occurs when batteries are low. An LED indicator can be included for status.

22 Claims, 11 Drawing Sheets

PROGRAMMABLE DIGITAL ELECTRONIC LOCK

This is a continuation-in-part of application Ser. No. 615,397, filed Mar. 12, 1996, now pending, and the disclosure of that copending application is incorporated herein by reference.

BACKGROUND OF THE INVENTION

This invention is concerned with security of lockers, safes, desks, file cabinets or other such storage devices assigned for temporary or long-term use. In particular, the invention relates to a lock operated by an electronic identification means for such storage situations.

Electronic locks are well known. For example, hotel safes for temporary use by guests have included digital locks with keypads for use by the guest. In some cases, the guest was able to select his own combination for the digital lock. In other cases, a combination sequence has been pre-assigned to electronic locks, with the combination sequence not under the control of the user.

The following U.S. Patents are believed to have some relevance to this invention: U.S. Pat. No. 5,153,561 (Johnson), U.S. Pat. No. 5,033,282 (Gartner), U.S. Pat. No. 5,021,776 (Anderson), U.S. Pat. No. 5,020,345 (Gartner), U.S. Pat. No. 4,887,445 (Beatty), U.S. Pat. No. 4,495,540 (Remington), U.S. Pat. No. 3,878,511 (Wagner), U.S. Pat. No. 3,831,065 (Martin), U.S. Pat. No. 3,754,213 (Merroni), and U.S. Pat. No. 3,753,164 (Zorzy).

There has been a need for an electronic lock operated by an electronic identification means of relatively inexpensive construction with more versatility as to use on various standard designs, modularity as to assembly and opposite-hand use, easy programmability and convenience and simplicity to the user. These are the goals of the present invention described below.

SUMMARY OF THE INVENTION

In accordance with the present invention, an electronic lock is provided for convenient use in lockers, safes, file cabinets and desks using electronic identification. In one preferred embodiment, the electronic lock has an inner housing secured at the inside of the locker door and an outer housing secured on the outside of the door. Through an opening in the door, a plug-in connector means provides electrical connection between the inner housing and the outer housing, through the door. The lock is built to fit through a standard three-hole locker door prep. The center hole of this standard pattern is used for the connector means and the top and bottom holes for mounting the front housing to the back housing through the door. In the outer housing is a receiving means exposed at the outer side of the outer housing for touching or inserting of an electronic identification device. The inner housing has a solenoid connected to a latch or mortise, such that the position of the latch is controlled by the solenoid. Connected between the receiving means and the solenoid, is a microcontroller means for causing the solenoid to shift the position of the latch when the correct electronic identification device is touched or inserted to the electronic lock's receiving means. Also within the inner housing is a battery connected to supply power to the electronic lock, including the microcontroller means and the solenoid.

As mentioned above, a solenoid provides for retraction and unlatching of the lock's latch, bolt or blocking means. A spring constantly urges the latch toward the latched position, and the latch may have a beveled or cammed face to allow its automatic, mechanical retraction and latching when the door is closed. Properly contacting the lock with a selected hand held electronic identification device or "key" device by a user is effective to retract the latch momentarily to allow opening of the door. In some cases, the latch may act as the blocking means for another locking or latching mechanism wherein the locking mechanism's operation is blocked by the latch. For example, in the case of a safe, the locking bolt mechanisms are generally attached to an outside handle. Turning of the handle moves the locking bolts in and out to the locking and unlocking positions. The latch unit of the present invention, with its spring constantly urging it toward the locked position, blocks the handle from turning. The momentary movement of the latch by retraction of the solenoid allows the user to turn the handle and unlock the safe. When the handle is turned back to the locked position, the latch unit re-locks automatically with the push of its spring.

In one preferred embodiment, the electronic lock is equipped with means to read or write data to the electronic identification device or key device. The electronic identification devices are rugged data carriers that act as an electronic number for automatic identification, such as those made by Dallas Semiconductor, models 1990 and 1992. These devices operate with one wire bus protocol requiring minimal wiring and interface components providing a simple and inexpensive approach to communications between the identification device and the microcontroller means in the lock. These identification devices are generally available in two categories, read only, and read and write. The read only electronic identification devices are supplied with a unique 64 bit identification code. These are used in the present invention as the electronic identification means when the operation of the system calls for a uniquely marked randomly issued electronic identification means. The read and write electronic identification devices are supplied with a 64 bit identification code in addition to a non volatile memory. These are used in the present invention as the electronic identification means when the operation of the system requires a series of predetermined identification numbers in a certain sequence. The non-volatile memory is programmed with the identification numbers desired for the operation. These electronic identification devices are also utilized as programming tools. In this case, additional programming commands and information are recorded into the EEPROM portion of the electronic identification device for providing commands and passwords for programming the electronic lock device. The system can include a user programming key device and a separate master programming key device, each of which is effective when touched to the contacts of the lock to program the lock to accept the next-touched hand held electronic key device as an authorized key, recording the key device's code and storing it as an authorized code.

In this form, an identification device used as a programming tool programs the electronic lock to accept a user identification device as a valid code to open the lock. Touching or inserting the identification device programmer to the electronic lock followed by a new user identification device, programs the lock to be opened by the new user identification device. This user identification device is then assigned to a user. The user unlocks the locked unit by touching or inserting the identification device to the contacts or opening at the outside face of the outer housing. In the case of a gym, users are assigned identification devices which also contain the associated locker number when they arrive in exchange for their membership card. In this situation the identification devices are attached to a badge clip which can be attached to clothing for convenient storage during workouts. In the case of hotels, such as hotel room safes, the electronic lock is pre-programmed with a set number of identification devices that can open the electronic lock. These identification device codes are stored in sequential order in the electronic lock's memory. To unlock the electronic lock, the identification device must satisfy two conditions: 1) it is an identification device previously programmed into the electronic lock and 2) the identification device is the next available not previously used identification device code in the electronic lock's memory. Users are issued an identification device by the hotel at the time of registration.

The inner housing, which as noted above is connected by a plug-in connector with the outer, exposed housing through the locker door, is larger and preferably holds a battery for operation of the lock. In one embodiment, the battery is comprised of a pair of nine-volt batteries contained in this inner unit. These may be connected in parallel to power the microcontroller, solenoid, LED, and a beeper or tone generator for long life, which may be approximately three years. In normal use, most of the time the electronic lock in either embodiment is almost entirely quiescent, drawing very little power.

In preferred embodiments, the electronic lock of the invention is modular, fitting most existing styles of locker doors, cabinet doors or safe doors. Preferably it fits the standard three-hole locker door prep comprising three holes aligned vertically. The two-piece, two-housing construction, with the simple plug-in electrical connection between them, allows for efficient and rapid installation or retrofitting. The unit, including both housings, can be secured to a door using only two threaded fasteners. In addition, as noted above, the device can be used on either left-handed or right-handed doors, with the rear or inner housing merely turned around 180° and plugged together with the outer housing in the same manner. The plug-in connection has its contacts duplicated to allow this.

Preferably a master and a grand master identification devices are recognized by the microcontroller for overriding the programmed identification device for the immediate user. This allows opening of the locker door when the identification device has been lost or other such situations.

In the event of low battery condition, the unit activates a beep or tone signal when it is used, signifying low battery power similar to a smoke detector. If the battery is completely dead or too weak to retract the latch, the electronic lock unit may be "jumped" via a pair of recesses on the front of the outer housing with terminals inside. Thus, a battery of the correct voltage can be used to supply power into the unit via conductors entering the two recesses, to permit opening the door using the correct electronic identification device. Once the door is opened, access can be gained to the inner housing unit, for replacement of batteries.

It is accordingly among the objects of the invention to provide a very easily used, inexpensively produced modular programmable electronic lock for lockers and similar situations for storage of articles. These and other objects, advantages and features of the invention will be apparent from the following description of preferred embodiments, considered with the accompanying drawings.

DESCRIPTION OF PREFERRED EMBODIMENTS

Figure 1:
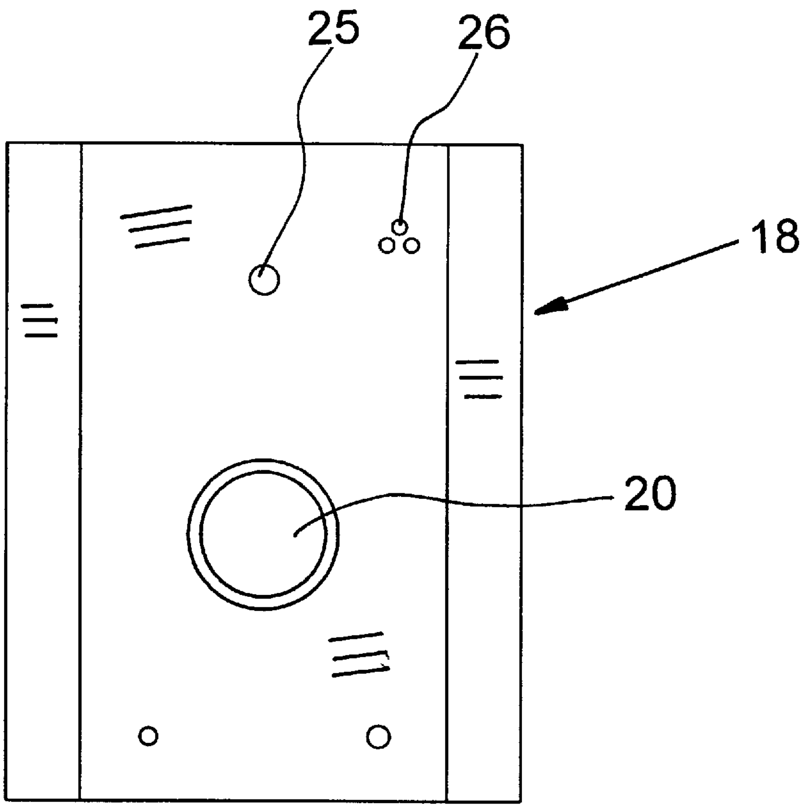
FIG. 1 is a frontal perspective view showing a front unit of an electronic lock in accordance with the present invention.

FIG. 1 shows the outer housing of a lock of this invention. The outer housing 18, as will be explained below, connects through the locker door with an inner unit which may include and control the movement of a mortise, or which controls another lock or latch component. The word "latch" or "latched" as used in the claims is intended to address either situation, wherein the latch is a mortise directly engaging a jamb to lock a door, or wherein the latch is a blocking device preventing movement of another door opening or locking component which itself must be moved in order to open the door.

As can be seen in FIG. 1, the front or outer housing 18 has a recess or opening or region 20 for receiving the electronic identification devices. The center part of the recess 20 is electrically isolated for receiving data while the metal body of the outer housing 18 provides the ground connection for reading the electronic identification device over the one wire bus protocol requiring contact by an isolated contact and a ground as a pair of conductors. The housing 18 in one preferred embodiment is of metal, for ruggedness and durability as well as resistance to vandalism and theft.

Also indicated in FIG. 1 is an LED indicator 25 which may be located above the recess region 20 as shown, and a small speaker or sound emitter indicated as small holes 26 in the housing or casing. Through these holes 26 a "beep" or other audible signal is emitted to indicate status.

Figure 1A:
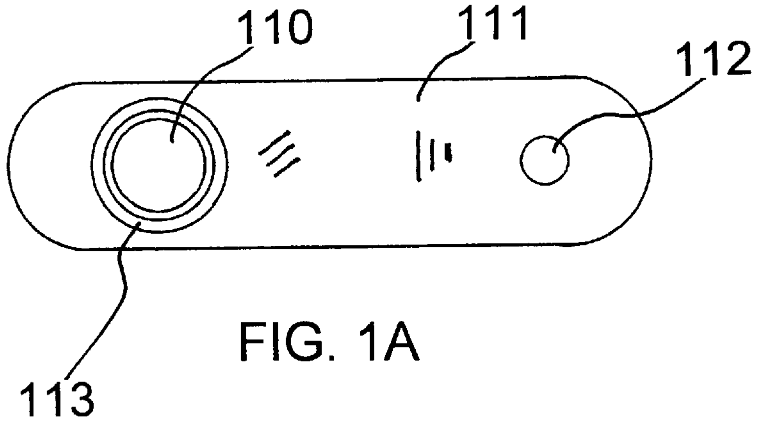
FIGS. 1A and 1B are frontal and side views of the electronic identification device of the present invention attached to a fob.
Figure 1B:
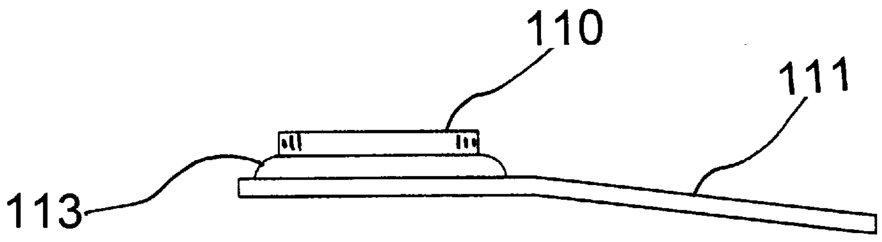

FIGS. 1A and 1B are front and side views of a hand-held electronic key device or identification device 110 as described above, attached to a fob 111. The electronic identification device 110 is secured to the fob by a retaining ring 113, and the fob may have a hole 112 for attachment to a key ring, for example.

Figure 1C:
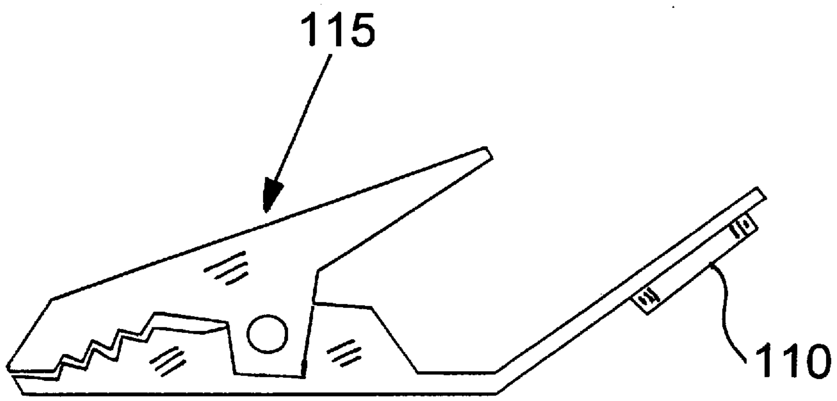
FIG. 1C is a side view showing a badge clip with an electronic identification device of the present invention.

FIG. 1C shows a side view of the electronic identification device 110 attached to a badge clip 115. The clip is used for attaching the identification device to clothing.

As described above, a user holds the identification device 110 by the fob 111 or the clip 115, and touches it to the electrically isolated region or recess 20 on the lock for access to the locker or other locked device making proper two-conductor contact by nesting the key device properly.

Figure 2:
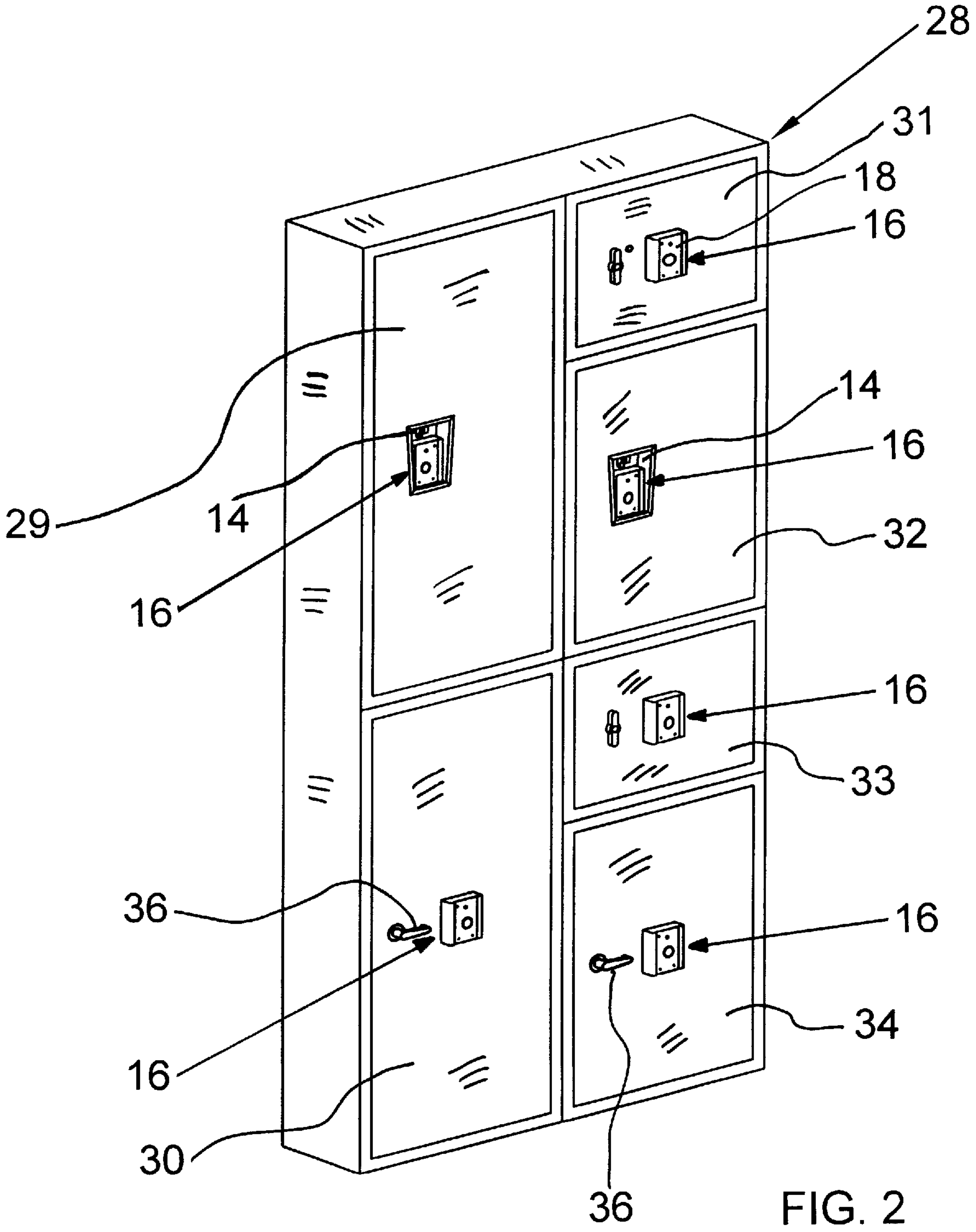
FIG. 2 is a perspective view showing a bank of lockers, each having an electronic lock of the invention.

FIG. 2 shows a bank of lockers 28 of various size, typical of lockers assigned for temporary use (e.g. one to four hours) in a fitness gym. These lockers are shown with electronic locks 16 of the invention, with the outer housing 18 visible. Some locks 16 are within recesses 14 as shown, and some are simply flat-mounted on the surfaces of locker doors 30, 31, 33, and 34. Locker doors 30 and 34 are shown as including a handle 36 which facilitates the actual manual opening of the locker door. In this case, the digital electronic lock 16 of the invention acts to release the handle when unlocked, so that the user can manually turn the handle 36 and then pull to open the door. Locker doors 29 and 32 have the lock 16 mounted with the outer housing 18 within the recess 14, and the inner housing (not shown in FIG. 2) has an internal locking mechanism which engages with fixed locker structure. When in locked mode the electronic lock 16 of the invention blocks the internal locking mechanism from moving to disengage from the fixed locker structure to unlock the locker. Locker doors 31 and 33 operate in a somewhat different manner. The bolt or latch of the lock 16 acts directly as the blocking element preventing the door from being pulled open by extending outwardly when in the locked position.

Figure 3:
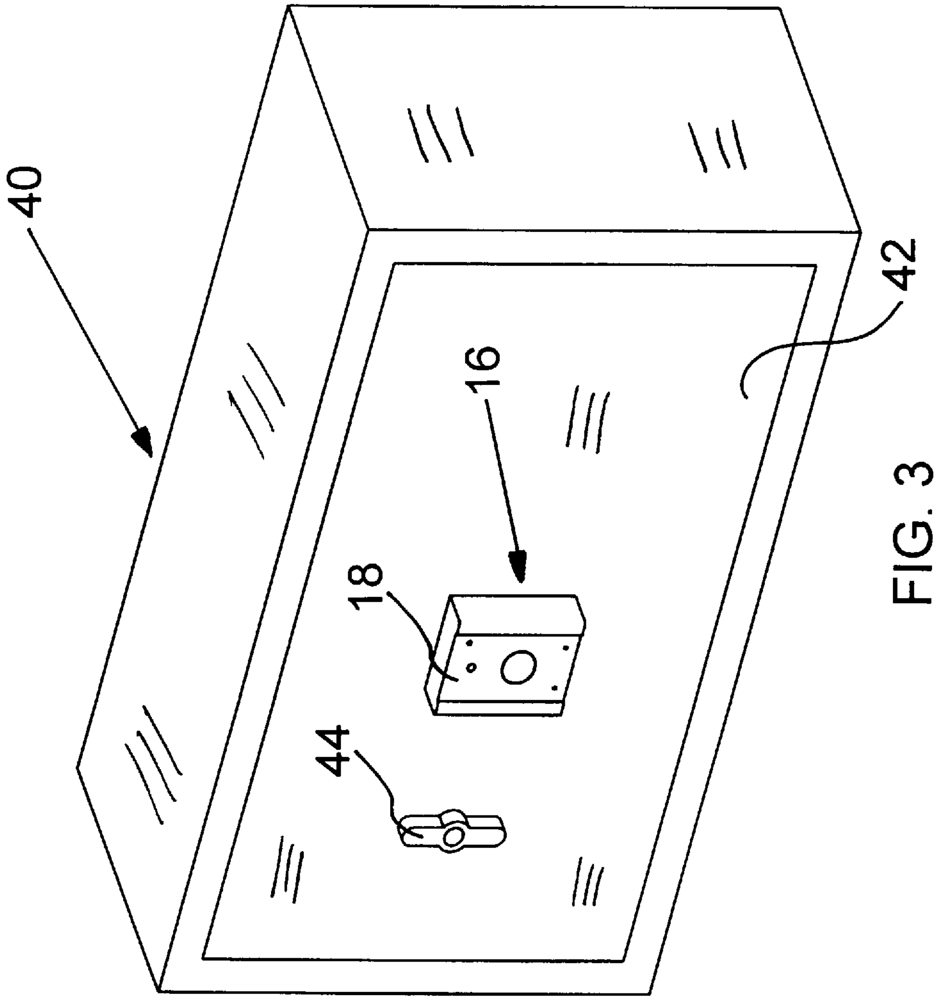
FIG. 3 is a perspective view indicating a safe which incorporates the electronic lock of the invention.

FIG. 3 shows, somewhat schematically, a safe 40 of the type which might be built into a hotel room wall, for example. The safe 40 is shown as including an electronic lock 16 of the invention, with the outer housing 18 mounted on the surface of the safe door 42. In this case, the safe is shown with a handle 44 for manually opening the door, and this handle is inhibited internally by a lock or latch which is under the control of the electronic lock 16.

Figure 4:
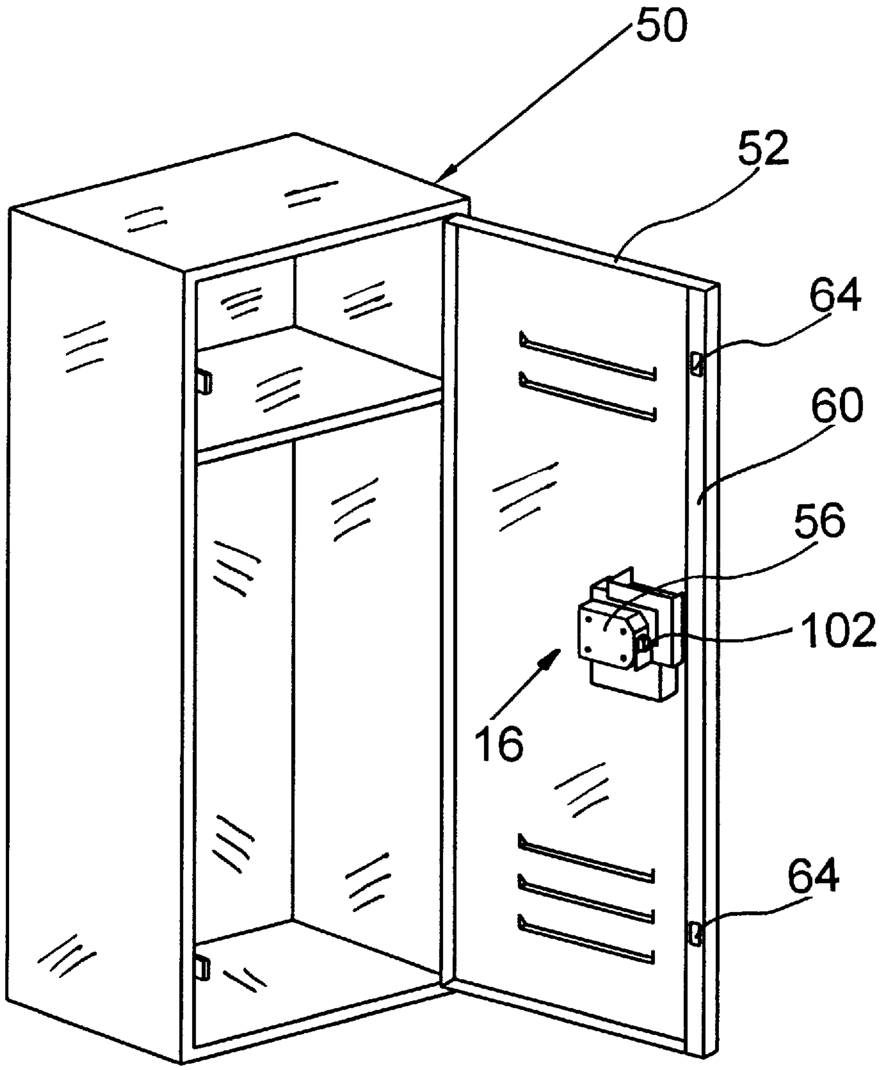
FIG. 4 is a perspective view showing a locker with its door opened, showing an inner unit or housing of the electronic lock.
Figure 4A:
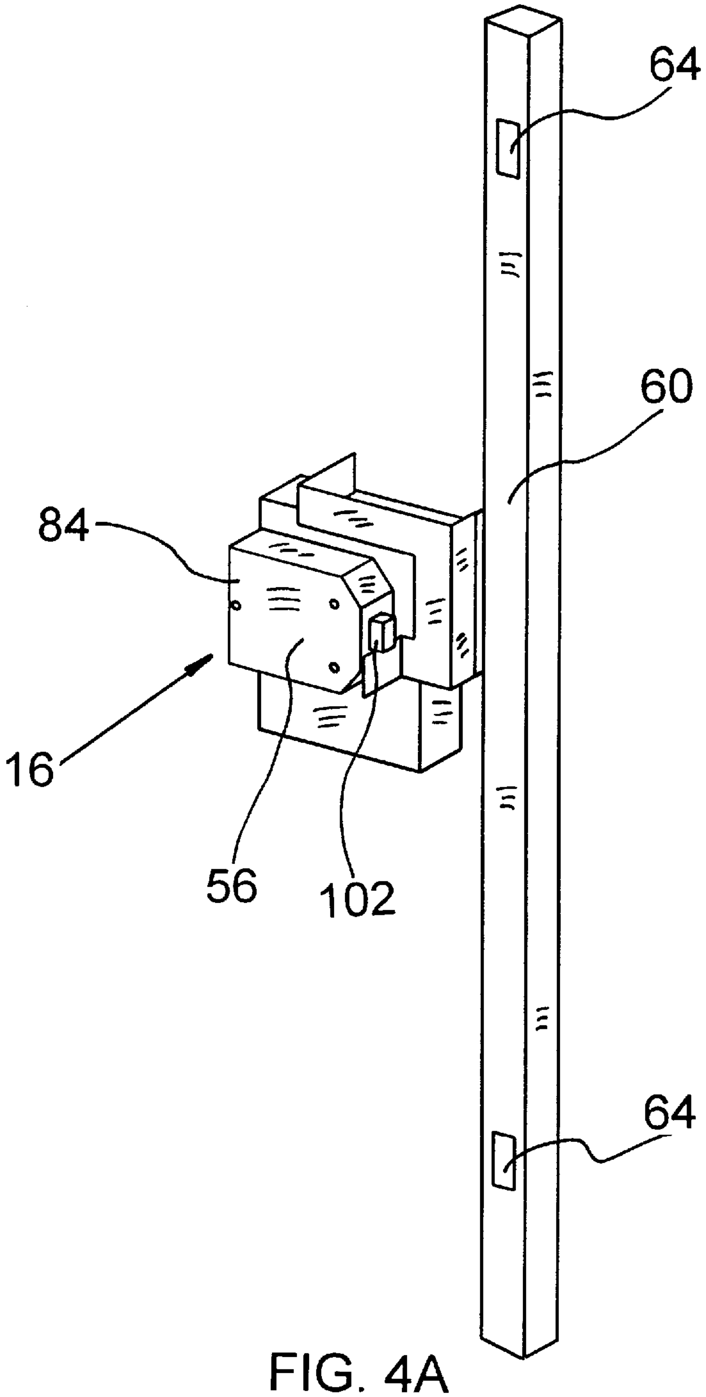
FIG. 4A is a an enlarged sectional view of the locking unit mechanism of the opened locker door.

FIG. 4 and FIG. 4A show a locker 50 with its door 52 open, and including a digital electronic lock assembly 16 of the invention. FIG. 4 reveals the back side of the locker door 52, showing an inner housing or back housing or unit 56. The inner housing unit 56 has a latch 102 which, in this preferred embodiment, engages a vertically slidable member 60 which, when locked into position by the latch, prevents lifting of a handle to open the locker. The locker 50 may be similar to the locker 29 shown in FIG. 2, with a recess handle 36 (not shown in FIG. 4) which must be lifted by the user to open the locker door 52. Locker door catches are shown on the locker at 60, with openings 64 in the locker door edge also indicated, for engaging and latching the locker closed whenever the door is pushed to the closed position.

The electronic lock of the invention has been illustrated and described in the context of lockers, such as used in fitness gyms, schools, etc. However, it should be understood that the term "locker," as used in the claims, is intended to include not only lockers of the types described and illustrated but also safes (as in FIG. 3), lock boxes, storage vaults or containers, and other applicable uses wherein access is to be granted to a door or other latchable facility only when the correct identification device is touched or inserted. Thus, the term "locker" should be understood in a broader sense than the typical usage.

Figure 5:
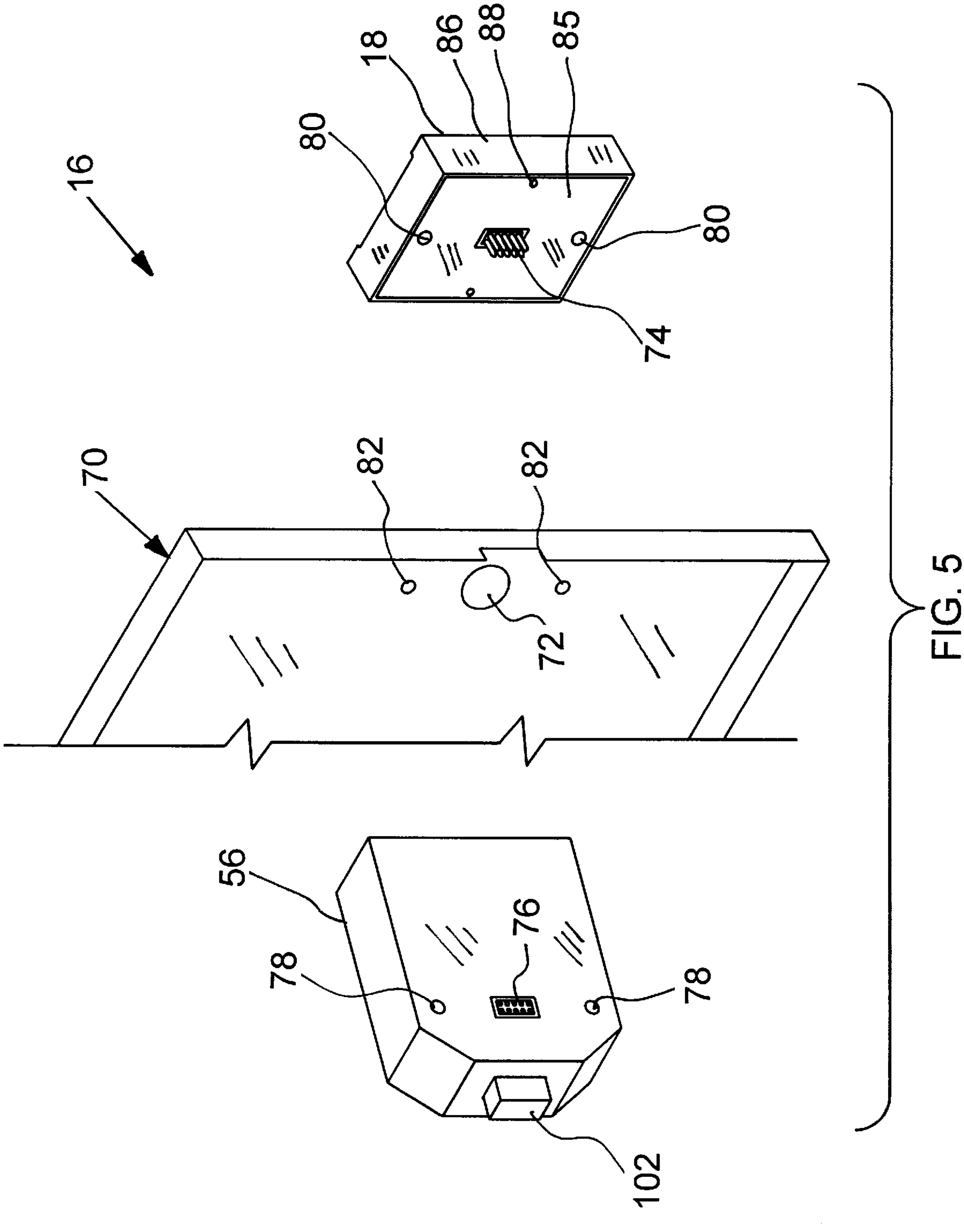
FIG. 5 is an exploded view in perspective, indicating assembly of the two sub-units or housings of the electronic lock, through a locker door.
Figure 6:
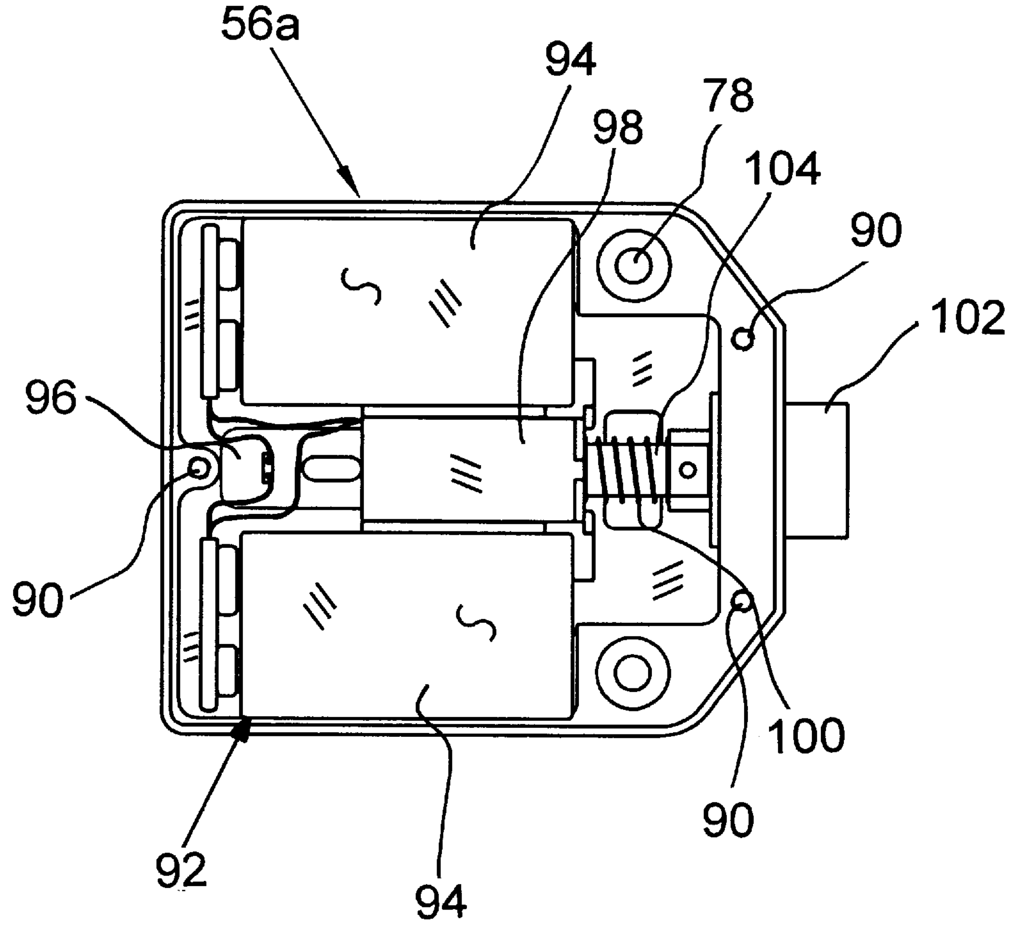
FIG. 6 is an elevation view of the inner housing of the lock, with a cover plate removed.

FIGS. 5 and 6 show further details of electronic lock assemblies 16 of the invention. FIG. 5 shows in exploded view an embodiment of the digital electronic lock 16 of the invention, with the outer housing 18 indicated as in position to be assembled through a locker door 70 to the rear or inner housing 56. As shown schematically in FIG. 5, a hole 72 is provided in the locker door, for receiving a plug-in electrical connection between the outer and inner housings 18 and 56. The outer housing 18 has a series of connector pins 74 which may be six in number, and, when the housing 18 is correctly positioned on the locker door, these pins are aligned to pass generally centrally through the locker door hole 72, to be received in a pin connector receptacle or socket 76 of the inner housing 56. The pin connectors 74 and 76 are so wired within the housings 18 and 56 as to allow opposite-hand connection as discussed above; that is, the inner housing 56 can be rotated over 180° (about a horizontal axis passing through the hole 72) to receive the pins 74 in the opposite configuration as well, with no change in the resulting electrical connection. This modular feature and construction enhance the versatility of the lock device. Additionally, the lock device is built to fit the standard three-hole door prep for lockers, generally depicted in FIG. 5. The holes 82 on the door are for the mounting of the lock's front housing to the back housing of the lock, securing the lock on the door. The standard three-hole locker door prep has a middle hole 72 of approximately 0.66 inch diameter; and upper and lower holes 82 of approximately 0.215 inch diameter, the three holes being aligned and the upper and lower holes 82 each being spaced approximately 1.09 inches from the middle hole (center to center). Some manufacturers make the three holes slightly wider, to an oval or racetrack shape, to allow lateral adjustment, but this is the same standard.

As indicated in the drawing, the inner housing 56 has bores at 78, and these are spaced similarly to bores 80 on the back side of the front or outer housing 18. The relationship of the bores 78, 80 to the plug-in pin connector apparatus is the same on both housings, so that, when the two housings are brought together with the locker door between, and the pin connectors are plugged together, the bores 78 and 80 are directly aligned. In a preferred embodiment the bores 80 are tapped holes, with threads for receiving machine screws which pass through the inner housing bores 78 and a pair of similarly aligned holes 82 in the locker door. Thus, as shown in FIG. 6 indicating a preferred embodiment **16*a* of the inner housing, with a back side cover removed (see back cover 84 in FIG. 4A), machine screws (not shown) may be inserted through the holes 78 from the inside of the inner housing 56*a*. These threaded fasteners pass also through the locker door, i.e., the holes 82, and are threaded into the threaded bores 80 of the back side of the front (outer) housing 18**. With these two fasteners tightened down, the whole assembly is held together to the locker door with only two fasteners.

FIG. 5 also shows that the back plate 85 of the outer housing 18 may be held to a body component 86 of the housing by a pair of small machine screws 88. The back plate 84 (FIG. 4A) of the inner housing 56 may be held in place by three small machine screws (not shown), threaded receiving holes for which are shown at 90 in FIG. 6.

As shown in FIG. 6, the inner housing 56 preferably is larger than the outer housing and includes space for receiving a battery generally indicated as 92. The term "battery" is used in its technical sense of meaning one or more cells which together make up the battery to power a device, and in this case the battery 92 may include two nine-volt cells or batteries 94 as shown. These nine-volt batteries provide ample power for driving the electronic lock up to several years, preferably with the two batteries 94 connected in parallel.

As explained previously, the electronic lock of the invention is on a locker or other storage facility designed in such that the solenoid acts only in one direction, to retract the latch against the force of the spring 100 for a momentary, timed pulse which may be about two or three seconds. In that case, the latch or mortise will have a beveled camming surface so as to retract against the spring when necessary for the locker door to close.

As discussed above, a microcontroller device is included in the electronic locks of the invention. The microcontroller and associated circuitry may be in either of the housings 56 or 18; in a preferred embodiment, this circuitry is included in the outer housing 18. Thus, the outer housing 18 may include, not shown in the drawings, a circuit board wired to the receiving means or electronic access means 20 (see FIG. 1), with the microcontroller device on the circuit board. As an example, the microcontroller may be a Motorola 68HC705J1A.

FIGS. 7A–9 are abbreviated flow charts showing the routine of operation and programming included in the microcontroller device of the invention, for carrying out the functions of the digital electronic lock.

Figure 7A:
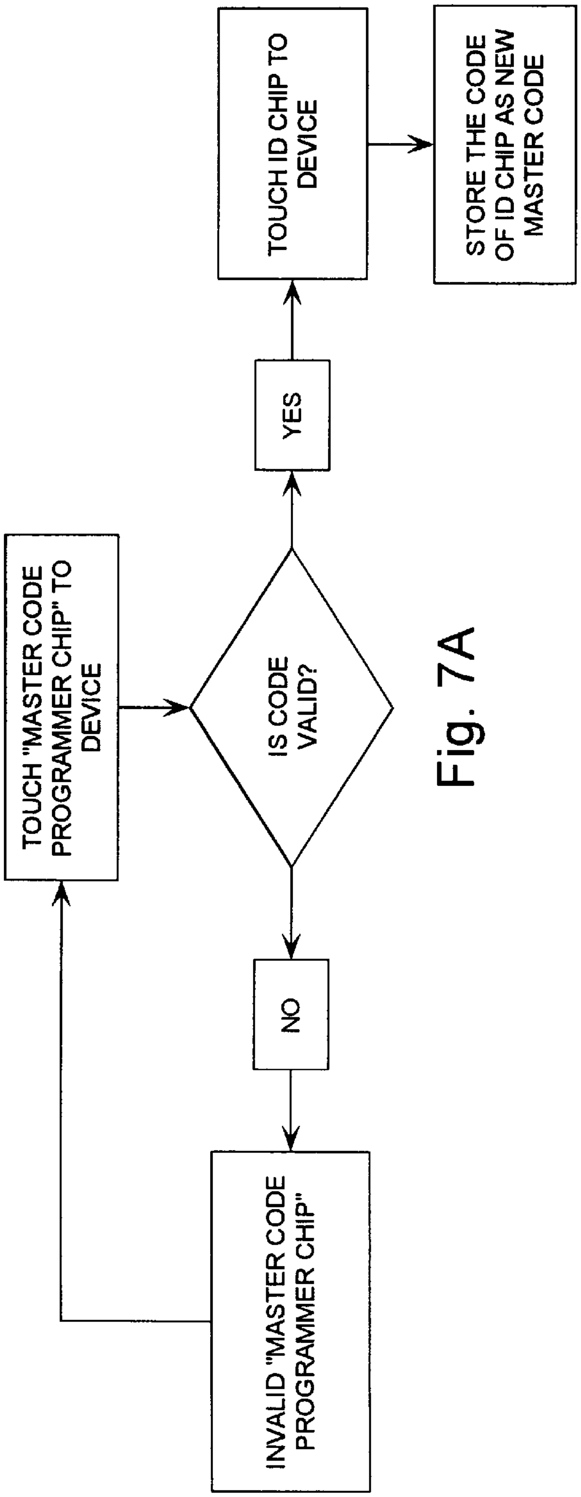
FIGS. 7A and 7B, 8 and 9 are simplified flow charts showing main routines of the electronic lock in a preferred embodiment.
Figure 7B:
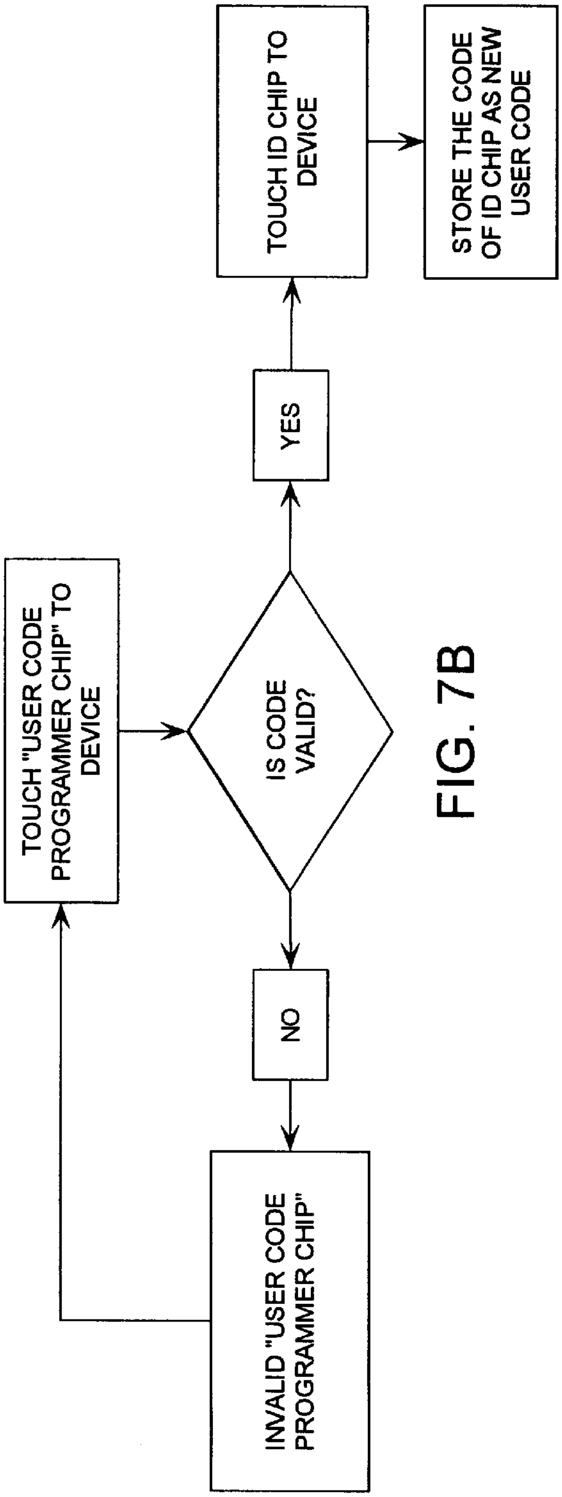

FIGS. 7A and 7B show programming flow for health club usage of the invention. There are two program mini "keys": 1) the master code programmer and 2) user code programmer. Each programs an operating "key" of its level. Touching or inserting of the master code programming key prepares the lock to receive the new operating master "key" and touching or inserting of the user code programming key prepares the lock to receive the new operating user "key". The process can be repeated whenever a new operating key is desired.

The microcontroller in the lock is programmed to recognize the master programming key device and the user programming key device, as distinct programming keys. When the master programming key is used, the microcontroller reads its number and reads the code from the master programmer key chip and recognizes that code as representing the master programmer key. This causes the microcontroller to receive as the master key code, the code from the very next hand held electronic key device which is touched to the lock. This access code is stored specifically as the master access code, replacing the previous master access code, and the lock subsequently will not recognize that previous code. The user programming key works in the same way, except that the code from the user programming key is kept in the lock's microcontroller separately. Thus, use of the master programming key will not affect the stored user access code, and use of the user programming key will not affect the stored master access code.

If one of the user programming key or master programming key is lost, a new key can be provided to the business or institution with the lockers or safes, and the lock microcontroller is programmed to recognize the new key device's code as the next code in a sequence kept by the manufacturer and stored in the microcontroller. The microcontroller then voids the code of the previous master programming device and only accepts the replacement master programming device as the correct master programming code.

Figure 8:
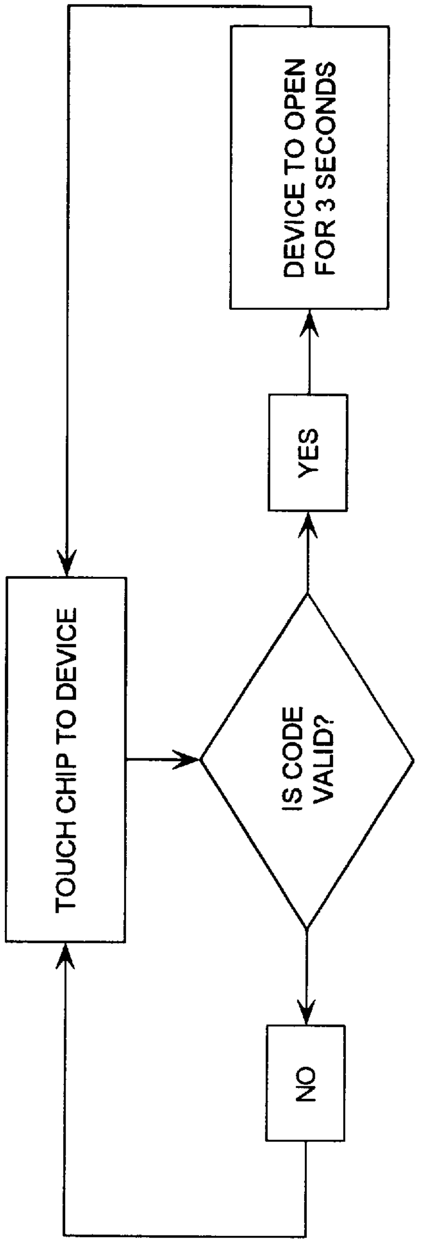

FIG. 8 shows the operation of the lock in the health club usage. Touching or insertion of the correct "key" unlocks the lock by pulling the latch or clearing the locking element for the user to pull and open the door.

Figure 9:
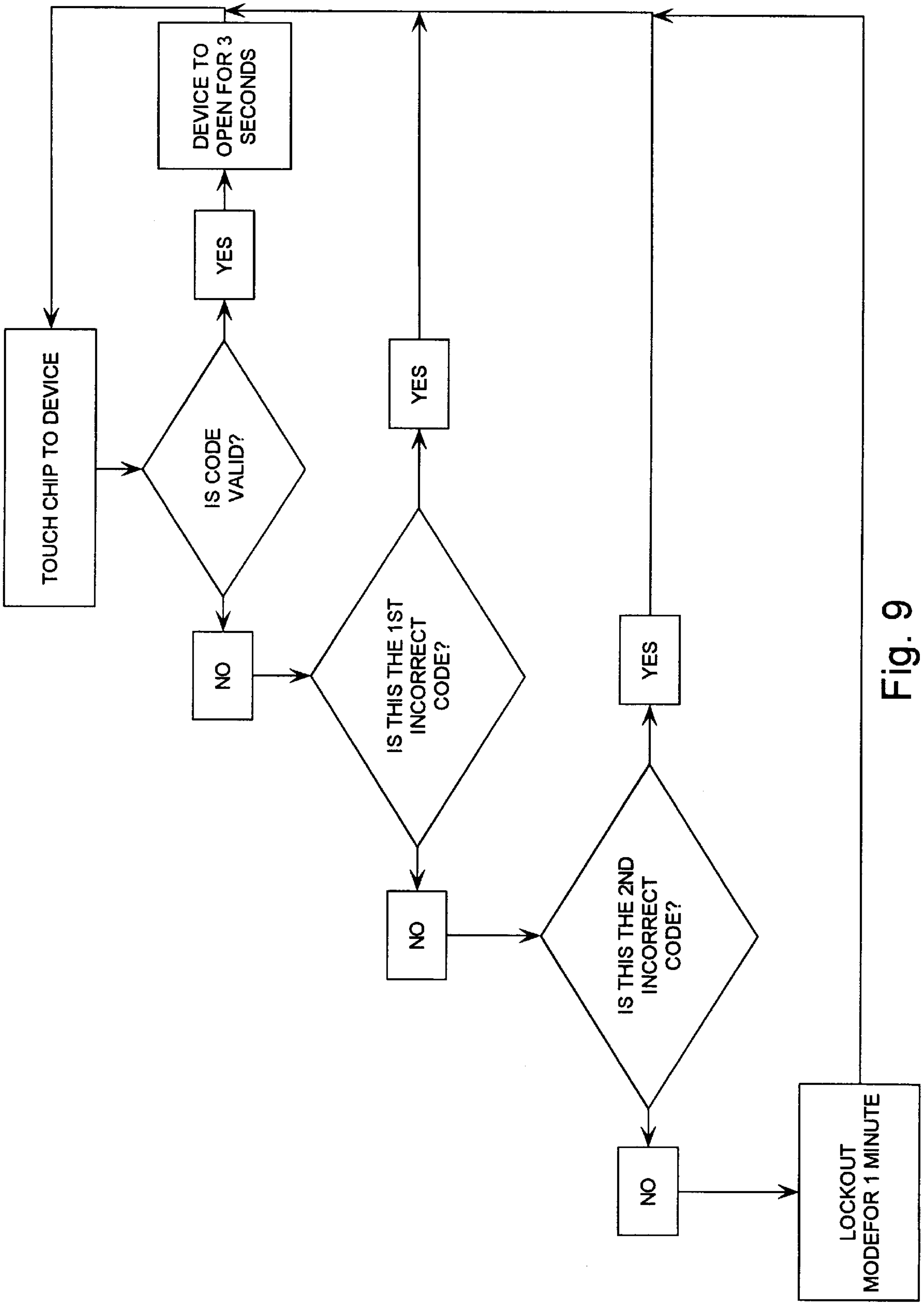

FIG. 9 shows the operation of the lock in a hotel safe. Like the health club usage, touching or insertion of the correct "key" device unlocks the lock. An additional feature disables the safe if three incorrect keys have attempted to unlock the lock.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. In combination with a locker for temporary storage of a user's articles, the locker having a door and a movable latch positioned to secure the door when in latched position and to unlock the door when moved to an unlatched position, an electronic lock for controlling the latch, comprising:

an inner housing and an outer housing, the inner housing being secured at the inside of the door and the outer housing being secured at a directly opposed position on the outside of the door such that the door is sandwiched between the two housings, with cordless plug-in connector means affixed to the housings for electrically and modularly connecting the inner housing directly to the outer housing, through an opening in the door, the plug-in connector means including opposed sets of electrical contacts, one set fixed to each housing and oriented toward the other set so as to connect together through the opening when the housings are secured to the door, electronic access means in the outer housing, for receiving an access code input by a user, a solenoid in the inner housing, connected to the latch so as to control the position of the latch, microcontroller means connected between the electronic access means and the solenoid, for causing the solenoid to change the position of the latch when a preselected access code is received by the electronic access means, and a battery in one of the housings, connected to supply power to the electronic lock.

2. The apparatus of claim 1, wherein the movable latch comprises a spring latch with beveled face so as to mechanically retract and then extend when the door is closed, and wherein the solenoid comprises a pull-only solenoid for momentary retraction of the latch, said microcontroller means including means for causing the solenoid momentarily to pull the spring latch to the unlatched position when said access code is received.

3. The apparatus of claim 1, further including LED indicator means on the outer housing, and the microcontroller means including means for illuminating the LED indicator means when the latch is in the unlatched position.

4. A plurality of lockers as in claim 1, in close proximity, each having said electronic locks.

5. The apparatus of claim 1, wherein the plug-in connector means includes reversible means for assembling the inner and outer housings in two 180°-opposed relative configurations for accommodating left-handed and right-handed locker doors while still making identical electrical connection between the inner and outer housings.

6. The apparatus of claim 1, further including means for securing the inner and outer housings to the door of the locker using no more than two threaded fasteners.

7. The apparatus of claim 1, wherein the outer housing is of metal.

8. The apparatus of claim 1, wherein the locker door has standard three-hole locker door prep comprising three holes in the locker door aligned vertically, including a middle hole comprising said opening through which the plug-in connector means connects the inner and outer housings, and the housings being secured to the door via the other two holes.

9. The application of claim 8, wherein the other two holes are upper and lower holes and wherein the inner housing and outer housing have bores which are aligned with the upper and lower holes, with fasteners extending from the inner housing bores through the upper and lower holes and into the outer housing bores to secure both housings to the locker door.

10. The apparatus of claim 1, wherein the outer housing has an exposed side with a pair of electrical terminals, with means for connection to an external power supply in lieu of said battery when and if the battery has insufficient power to operate the electronic lock.

11. The apparatus of claim 10, further including a pair of recesses on the exposed side of the outer housing, within which said terminals are positioned, such that the terminals are recessed from the exposed side of the outer housing.

12. The apparatus of claim 1, wherein the outer housing is no larger than about 2 inches in width, 3 inches in height and ⅝ inch in depth.

13. The apparatus of claim 12, wherein the inner housing is no larger than about 3¼ inches in width, 3 inches in height and ⅞ inch in depth.

14. The apparatus of claim 1, further including spring means biasing the latch toward the latched position, said solenoid being connected to retract the latch against the spring when activated by the microcontroller means, and said microcontroller means being programmed so that when said preselected access code is received by the electronic access means, the solenoid will retract the latch to the unlatched position momentarily, then release the latch, allowing the spring means to return the latch to the latched position.

15. The apparatus of claim 1, wherein the microcontroller means includes means for activating a pulsed audible sound when the battery is low.

16. The apparatus of claim 1, further including infrared signal receiver means on the exterior of the outer housing and connected to the microcontroller means, for receiving a signal from a hand-held infrared transmitter device for resetting the electronic lock to a different access code.

17. The apparatus of claim 1, wherein the electronic access means includes a recess on the outer housing with electric contacts comprising an isolated central area and conductive metal surrounding the central area, and further including a hand held electronic key device in combination with the lock, the key device including an electronic identification chip with a read-only memory storing a unique access code, the key device having an electrical contact means connected to the electronic identification chip for making contact with the electric contacts of the recess on the outer housing when properly touched thereto, and the microprocessor means having means for reading the unique access code from the identification chip and comparing the unique access code with said preselected access code stored in a memory of the microcontroller means.

18. The apparatus of claim 17, wherein the hand held electronic key device includes a spring-biased clip for engagement with an article of clothing of the user.

19. The apparatus of claim 1, wherein the electronic access means includes a pair of electric contacts on the outer housing, and further including a hand held electronic key device in combination with the lock, the key device including an electronic identification chip with a read-only memory storing a unique access code, the key device having an electrical contact means connected to the electronic identification chip for making contact with the electric contacts of the outer housing when properly touched thereto, and the microprocessor means having means for reading the unique access code from the identification chip and comparing the unique access code with said preselected access code stored in a memory of the microcontroller means, to determine whether the solenoid should be activated to change the position of the latch.

20. The apparatus of claim 19, wherein the hand held electronic key device includes a spring-biased clip for engagement with an article of clothing of the user.

21. The apparatus of claim 19, further including a user programming key device in a form similar to said hand held electronic key device, including programming means readable by the microcontroller means in the lock, for programming the microcontroller means, when the user programming device is touched to the electric contacts of the outer housing, to accept as said preselected access code a unique access code of the next-touched hand held electronic key device.

22. The apparatus of claim 21, further including a master programming key device in a form similar to said hand-held electronic key device, including programming means readable by the microcontroller means in the lock for programming the microcontroller means, when the user programming key device is touched to the electric contacts of the outer housing, to accept as said preselected access code a unique access code of the next-touched hand held electronic key device, said microcontroller means having means for storing the unique access code of the master programming key device separately from the access code of the user programming key device.

* * * * *